UNITED STATES PATENT OFFICE

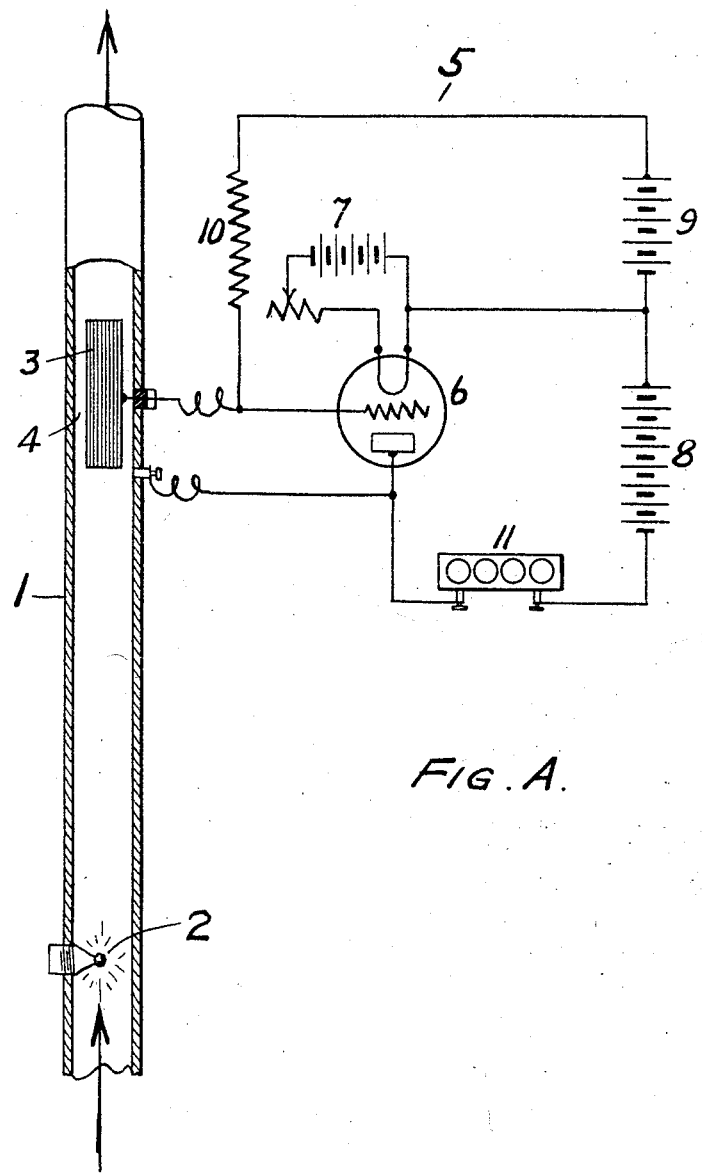
FIG. A.

ALFRED E. BLAKE, OF HAVERFORD TOWNSHIP, DELAWARE COUNTY, PENNSYLVANIA, ASSIGNOR TO THE UNITED GAS IMPROVEMENT COMPANY, OF PHILADELPHIA, PENNSYLVANIA, A CORPORATION OF PENNSYLVANIA

APPARATUS FOR METERING GASEOUS FLUIDS

Application filed October 18, 1928. Serial No. 313,218.

My invention consists in subjecting the gaseous fluids to be metered, for instance, natural or manufactured gaseous fuel, to exposure to the radiations from radio-active matter, for instance, some compound or preparation containing radium. This causes the gas, or gaseous mixture to become ionized, in which condition it is able to conduct electric current to an extent sufficient for my purpose. This ionization is caused to take place within a metallic or other tube, of a capacity satisfactory for the maximum required for a particular size of meter.

At a suitable distance away from the radio-active preparation, within the tube, but carefully insulated from it electrically, is located a metallic electrode. The space between this electrode, and the tube forms a gap in an electrical circuit, upon which gap there is impressed a suitable potential voltage for the purpose required. This condition can be established either by use of batteries, or by utilization of any available source of alternating or direct current, with a suitable transformer, if necessary, with alternating current, and a suitable current rectifier, if it is desirable in any particular case to use unidirectional current.

There is provided suitable means for measuring any current which may flow in this circuit, or the effect of any current, as the case may be, whenever the conductivity of the gaseous fluid in the gap between the electrode and the walls of the tube becomes sufficient to pass a current at the potential voltage used.

Illustrating this device I present a diagrammatic drawing A, which shows: (1) Tube for passage of gas to be metered. (2) Source of radio-activity, such as a coating of radium chloride for causing formation of ions in gas. (3) Metal electrode in tube, but out of contact with it, supported by a carefully insulated conductor. (4) Free space between electrode and tube, to create a region in which the ions reaching it from the zone where they are formed, may respond to an impressed electro-motive force to discharge themselves upon the surface of the tube, or electrode, as the case may be, and thus cause flow of current in a circuit of which tube, gap, and electrode form a part. (5) Any suitable means for registering the flow of current in the circuit, or of creating by use of such current a means for releasing a sufficiently strong current to operate a registering device, such as the types commonly used for plotting results upon a moving strip of paper.

The operation of the assembly as a meter will be as follows:

When there is no flow of gas, the ions formed by the influence of, and from the radio-active matter itself will lose practically all their electric charges while they are still at a distance from the ionic discharge gap between the electrode and the tube; so that the non-conducting molecules of gases will not permit any flow of current. When flow of gas is in process, however, a greater or less number of ions will reach the gap depending upon the rate of flow, and these will, in turn, permit a greater or less flow of current over the gap and through the circuit, which directly, or indirectly, controls the recording mechanism. This recording mechanism is calibrated so as to denote quantities of gas. The meter can be placed in adjustment by changing the distance between the radio-active matter and the ionic discharge gap.

Such a means is indicated in the figure. The gap is connected across the plate and grid of a three element radio tube 6, the filament of the tube is lit by the A battery 7,— the B battery 8 and C battery 9 are connected in series across the gap, the C battery also supplying a negative bias to the grid of the tube through the resistance 10. The ammeter 11 which may be recording and integrating is connected in the plate circuit.

When there are ions present in the gas within the gap, a current will flow through the gap circuit under the influence of the potentials of the B and C batteries. As the gap circuit includes the resistance 10, there will be an R. I. drop across this resistance of such potential as to reduce the negative bias of the tube. According to the well-known characteristics of the three element tube, this will cause a flow of plate current, which will be many times the value of the current flowing through the gap circuit. An increase or decrease in the flow of the gas and the number of ions in the gap will produce a proportionate increase or decrease in the current flowing through the gap circuit, and a proportionate increase or decrease in the plate current.

The recording or integrating ammeter may be calibrated in, for instance, cu. ft. of gas per hour. The particular means above for amplifying and registering the current through the gap are not claimed.

I claim:

1. A gas meter including an element of radio-active material, a tube through which gas to be measured is adapted to flow, an element within said tube and electrically insulated therefrom, said tube and element forming a pair of spaced electrodes one of which is electrically insulated from said radio-active element, said electrodes being located relative to said radio-active element so as to be sensitive to the ionization of gas ionized by the radio-active element upon a flow of gas past the radio-active element.

2. A gas meter according to claim 1 wherein the electrodes are located in an electric circuit containing a source of current and means for amplifying the current passing through the electrodes.

3. A gas meter according to claim 1 wherein the electrodes are located in an electric circuit containing a source of current, means for amplifying the current passing through the electrodes and means for metering the amplified current.

4. A gas meter including a tube through which the gas to be measured is adapted to flow, a radio-active element located so as to cause ionization of gas within the tube, an element within said tube and insulated from said tube so as to form with said tube a pair of spaced electrodes, a three unit vacuum tube, connections between the spaced electrodes and the grid and the plate respectively of the vacuum tube, a source of electric current connected to said spaced electrodes, a source of electric current, means for connecting said second named source of current to said filament for heating the filament of the vacuum tube, and a circuit, including an electrical meter calibrated to measure the flow of gas, connected to the filament and the plate of the vacuum tube.

ALFRED E. BLAKE.